United States Patent
Lacey et al.

(10) Patent No.: US 6,768,830 B1
(45) Date of Patent: Jul. 27, 2004

(54) OPTICAL ADD/DROP SWITCH UTILIZING A MINIMAL NUMBER OF SWITCHING CROSSPOINTS

(75) Inventors: Jonathan P. R. Lacey, Palo Alto, CA (US); Douglas M. Baney, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 730 days.

(21) Appl. No.: 09/591,443

(22) Filed: Jun. 9, 2000

(51) Int. Cl.[7] .................................................. G02B 6/26
(52) U.S. Cl. ............................ 385/18; 385/15; 385/17; 385/19; 385/24
(58) Field of Search ............................... 385/15, 1, 24, 385/39, 40, 47; 398/43, 45, 49, 50, 68, 83

(56) References Cited

U.S. PATENT DOCUMENTS

| | | | |
|---|---|---|---|
| 4,988,157 A | 1/1991 | Jackel et al. ............ | 350/96.13 |
| 5,699,462 A | 12/1997 | Fouquet et al. ............ | 385/18 |
| 5,960,131 A | 9/1999 | Fouquet et al. ............ | 385/17 |
| 6,055,344 A | 4/2000 | Fouquet et al. ............ | 385/16 |
| 6,396,972 B1 * | 5/2002 | O'Rourke et al. ............ | 385/17 |

FOREIGN PATENT DOCUMENTS

| | | | |
|---|---|---|---|
| JP | 8-62645 | * | 3/1996 |
| JP | 11-202373 | * | 7/1999 |
| JP | 2000-032510 | * | 1/2000 |

* cited by examiner

Primary Examiner—Juliana K. Kang

(57) ABSTRACT

An optical switch, preferably an add/drop switch, includes a minimal number of two-state switching arrangements, thereby facilitating a reduction of switch complexity. Light pulses entering the switch via a given input port may be directed to either a corresponding output port or a corresponding drop port by the operation of the switching arrangements. Light pulses entering the switch via a given add port may be directed to a corresponding output port or may be disbursed by the operation of the switching arrangements. The switching arrangements are toggled between reflective and transmissive states. In the preferred embodiment, the two-state switching arrangements are controlled by the manipulation of index matching fluid within trenches. Additionally, in the preferred embodiment, the switching arrangements are configured such that a given light pulse interacts with only one trench, thereby minimizing the overall signal loss and loss non-uniformities within the switch.

12 Claims, 6 Drawing Sheets

OPTICAL ADD/DROP SWITCH UTILIZING A MINIMAL NUMBER OF SWITCHING CROSSPOINTS

TECHNICAL FIELD

The invention relates to optical switching arrangements and more particularly to arrangements of optical switching units for selectively manipulating optical signals from input and add ports to corresponding output and drop ports in optical add-drop multiplexers.

BACKGROUND ART

While signals within telecommunications and data communications networks have traditionally been exchanged by transmitting electrical signals via electrically conductive lines, an alternative mode of data exchange is the transmission of optical signals through optical fibers. Information is exchanged in the form of modulations of laser-produced light. The equipment for efficiently generating and transmitting the optical signals has been designed and implemented, but the design of optical switches for use in telecommunications and data communications networks is problematic. As a result, switching requirements within a network that transmits optical signals are sometimes satisfied by converting the optical signals to electrical signals at the inputs of a switching network, and then reconverting the electrical signals to optical signals at the outputs of the switching network.

Recently, reliable optical switching systems have been developed. U.S. Pat. No. 5,699,462 to Fouquet et al., which is assigned to the assignee of the present invention, describes a switching matrix that may be used for routing optical signals from any one of a number of parallel input optical fibers to any one of a number of parallel output optical fibers. An isolated switching unit 10 is shown in FIG. 1. The switching unit includes planar waveguides that are formed by layers on a substrate. The waveguide layers include a lower cladding layer 14, an optical core 16, and an upper cladding layer, not shown. The optical core is primarily silicon dioxide, but with other materials that achieve a desired index of refraction for the core. The cladding layers are formed of a material having a refractive index lower than that of the core material, so that optical signals are guided along the core.

The layer of core materials 16 is patterned into waveguide segments that define a first input waveguide 20 and a first output waveguide 26 of a first optical path and define a second input waveguide 24 with a second output waveguide 22 of a second optical path. The upper cladding layer is then deposited over the patterned core material. A gap is formed by etching a trench 28 through the core material, the upper cladding layer, and at least a portion of the lower cladding layer 14. The first input waveguide 20 and the second output waveguide 22 intersect a sidewall of the trench 28 at an angle of incidence greater than the critical angle of total internal reflection (TIR) when the junction 30 of the waveguides is filled with a vapor or gas. Thus, TIR diverts light from the input waveguide 20 to the output waveguide 22, unless an index-matching fluid resides within the junction 30 between the aligned input and output waveguides 20 and 26. The trench 28 is positioned with respect to the four waveguides such that one sidewall of the trench passes through or is slightly offset from the intersection of the axes of the waveguides.

The above-identified patent of Fouquet et al. describes a number of alternative approaches to switching the optical switching unit 10 between a transmissive state and a reflective state. One approach is illustrated in FIG. 1. The switching unit 10 includes a microheater 38 that controls formation of a bubble within the fluid-containing trench. While not shown in the embodiment of FIG. 1, the waveguides of a switching matrix are typically formed on a waveguide substrate and the heaters and heater control circuitry are integrated onto a heater substrate that is bonded to the waveguide substrate. The fluid within the trench has a refractive index that is close to the refractive index of the core material 16 of the four waveguides 20–26. Fluid fill-holes 34 and 36 may be used to provide a steady supply of fluid, but this is not critical. In the operation of the switching unit, the heater 38 is brought to a temperature sufficiently high to form a bubble in the index-matching fluid. Once formed, the bubble can be maintained in position by maintaining power to the heater. In FIG. 1, the bubble is positioned at the junction 30 of the four waveguides. Consequently, an input signal along the waveguide 20 will encounter a refractive index mismatch upon reaching the sidewall of the trench 28. This places the switching unit in a reflective state, causing the optical signal along the waveguide 20 to be redirected to the second output waveguide 22. However, even in the reflective state, the second input waveguide 24 is not in communication with the first output waveguide 26.

If the heater 38 at junction 30 is deactivated, the bubble will quickly condense and disappear. This allows index-matching fluid to fill the junction 30 for the waveguides 20–26. Since input signals will not encounter a significant change in refractive index at the interfaces of the input waveguides 20 and 24 with the trench 28, the switching unit 10 is then in the transmissive state. In the transmissive state, the optical signals along the first input waveguide 20 will propagate through the trench to the first output waveguide 26, while optical signals that are introduced via the second input waveguide 24 will propagate through the trench to the second output waveguide 22.

Matrices of the switching elements 10 may be used to form complex switching arrangements. A switching matrix may have any number of input ports (N) and any number of output ports (M), with each port being connected to an optical fiber. The fluid-controlled switching units allow the arrangement to be a strictly "non-blocking" matrix, since any free input fiber may be optically coupled to any free output fiber without rearrangement of the existing connections.

Another type of switching matrix is an add/drop multiplexer that includes add ports and drop ports in addition to the input and output ports. Such multiplexers are utilized in telecommunications applications in which signals are passed through a series of nodes, with each node being able to introduce additional signals and being able to extract those signals that identify that node as a target. For example, each node may be a switching facility of a long distance carrier that supports calls to and from a number of cities. Calls that originate in a city are introduced using add ports within the switching facility of that city. On the other hand, data and voice information for calls directed to a telephone supported by that switching facility are extracted via drop ports. A known switch 40 that can be used as a rearrangeable add/drop switch is shown in FIG. 2. The arrangement includes a 4×4 matrix of optical switching units for selectively coupling any one of four input ports 42, 44, 46 and 48 to any one of four output ports 52, 54, 56 and 58. In FIG. 2, each of the switching units that is in a reflective state is shown as having a bubble at the area at the intersection of input and output waveguides to that switching unit. Thus, switching units 62, 64, 66 and 68 are each in a reflective state. The remaining twelve switching units are in a transmissive state, since there are no bubbles present at the intersections of the input and output waveguides to those switching units.

Optical fibers are connected to each of the input ports 42–48 and each of the output ports 52–58. An optical signal that is introduced at the input port 42 will be reflected at the switching unit 62 and will be output via the output port of 54. Similarly, an optical signal from the input port 44 will reflect at the switching unit 64 for output at the port 56. An optical signal from the input port 46 reflects at the switching unit 66 for output via the port 58. Finally, an optical signal on port 48 is reflected to output port 52 by the switching unit 68. By selectively manipulating the bubbles within the various trenches, any one of the input ports can be connected to any one of the output ports.

The switch 40 includes four add ports 72, 74, 76 and 78. Each add port is uniquely associated with one of the output ports 52–58, since an optical signal that is introduced at one of the add ports can be directed only to its aligned output port. Thus, an optical signal on add port 72 can be directed to the output port 52 by changing the switching unit 68 to the transmissive state. This change to the transmissive state places the input port 48 in optical communication with a drop port 88. The drop port 88 is uniquely associated with the input port 48, since the drop port cannot be optically coupled to any other input or add port. Similarly, each one of the three other drop ports 82, 84 and 86 is uniquely associated with one of the input ports 42, 44 and 46, respectively, with which the drop port is linearly aligned.

A concern with the optical switch 40 of FIG. 2 is that there is a relatively large cumulative loss that occurs as a consequence of the high number of switching units with which any one light pulse must come in contact, since there is a signal loss associated with each encounter with a switching unit. Moreover, the signal losses (i.e. insertion losses) will vary significantly from path to path. For example, an optical signal that enters at input port 42 and exits at output port 52 will encounter one switching unit, while an optical signal entering at input port 48 and exiting at output port 58 will encounter seven switching units. What is needed is an optical add/drop switch having a minimal number of switching units, thereby allowing the construction of large switches with generally uniform, acceptably low loss.

SUMMARY OF THE INVENTION

A generally uniform reduction in the signal loss characteristics along transmission paths within an add/drop switch are achieved by configuring a matrix of switching arrangements such that propagation through the matrix requires contact with a maximum of two switching arrangements. In the preferred embodiment, the switching arrangements are fluid-containing trenches and the add/drop switch has an array of parallel first optical paths with input ports at first ends and drop ports at second ends. Each optical path is formed of generally aligned waveguides that intersect only one fluid-containing trench. The first optical paths form crossing patterns with second optical paths having add ports at first ends and output ports at second ends. The fluid in each trench is manipulated such that a light pulse is either reflected by or transmitted through the trench. Each trench is positioned and oriented at the intersection of first and second optical paths so that when the trench is in a reflective state, the input and output ports of the two optical paths are optically connected. However, when the trench is in a transmissive state, the add and output ports of the two optical paths are coupled, as are the input and drop ports.

In the preferred embodiment, each trench defines a switching arrangement that is responsive to the manipulation of index-matching fluid to change between the reflective state and the transmissive state. Typically, the fluid is a liquid having a refractive index that closely matches the refractive index of the optical core material of the waveguides. Consequently, when fluid resides at the interface of a trench with a waveguide, an optical signal propagating through the waveguide will enter the trench and propagate to the generally aligned waveguide that is on the opposite side of the trench. On the other hand, when there is an absence of liquid at the waveguide-to-trench interface, the trench is in a reflective state and any optical signal that reaches the interface will be reflected. In one embodiment, the number (N) of input ports is equal to the number for each of the output ports, add ports and drop ports. However, other embodiments are contemplated.

In a second embodiment, each switching arrangement is defined by a pair of trenches along each first optical path. The pair of trenches is operated as a two-state unit that is responsive to the manipulation of index-matching fluid to simultaneously change both trenches between reflective states and the transmissive states. As in the first embodiment, the fluid is typically a liquid having a refractive index that closely matches the refractive index of the optical core material of the waveguides. Consequently, when fluid resides at the interface of a trench with a waveguide, an optical signal propagating through the waveguide will enter the trench and propagate to the generally aligned waveguide that is on the opposite side of the trench. On the other hand, when there is an absence of liquid at the waveguide-to-trench interface, the trench is in a reflective state and any optical signal that reaches the interface will be reflected.

In this second embodiment, transmission by both of the trenches that reside along a particular first optical path causes optically aligned input and output ports to be coupled, while reflection by both trenches causes operatively associated input and drop ports to be coupled and causes operatively associated add and output ports to be coupled. Preferably, the number (N) of input ports is equal to the number of each of the output ports, add ports and drop ports. However, other embodiments are contemplated.

An advantage of the invention is that by limiting the number of switching arrangements, the device may be manufactured on a single substrate having a significantly reduced complexity. In the add/drop switch embodiment, "add" signals can be switched to either the associated output ports or the associated drop ports without rearranging existing connections. Another advantage of the preferred embodiment is that any light pulse transmitted from an input or add port will interact with only one switching arrangement, thereby providing a structure in which signal losses are low and are substantially equal along all of the possible optical paths.

DETAILED DESCRIPTION

Figure 3:
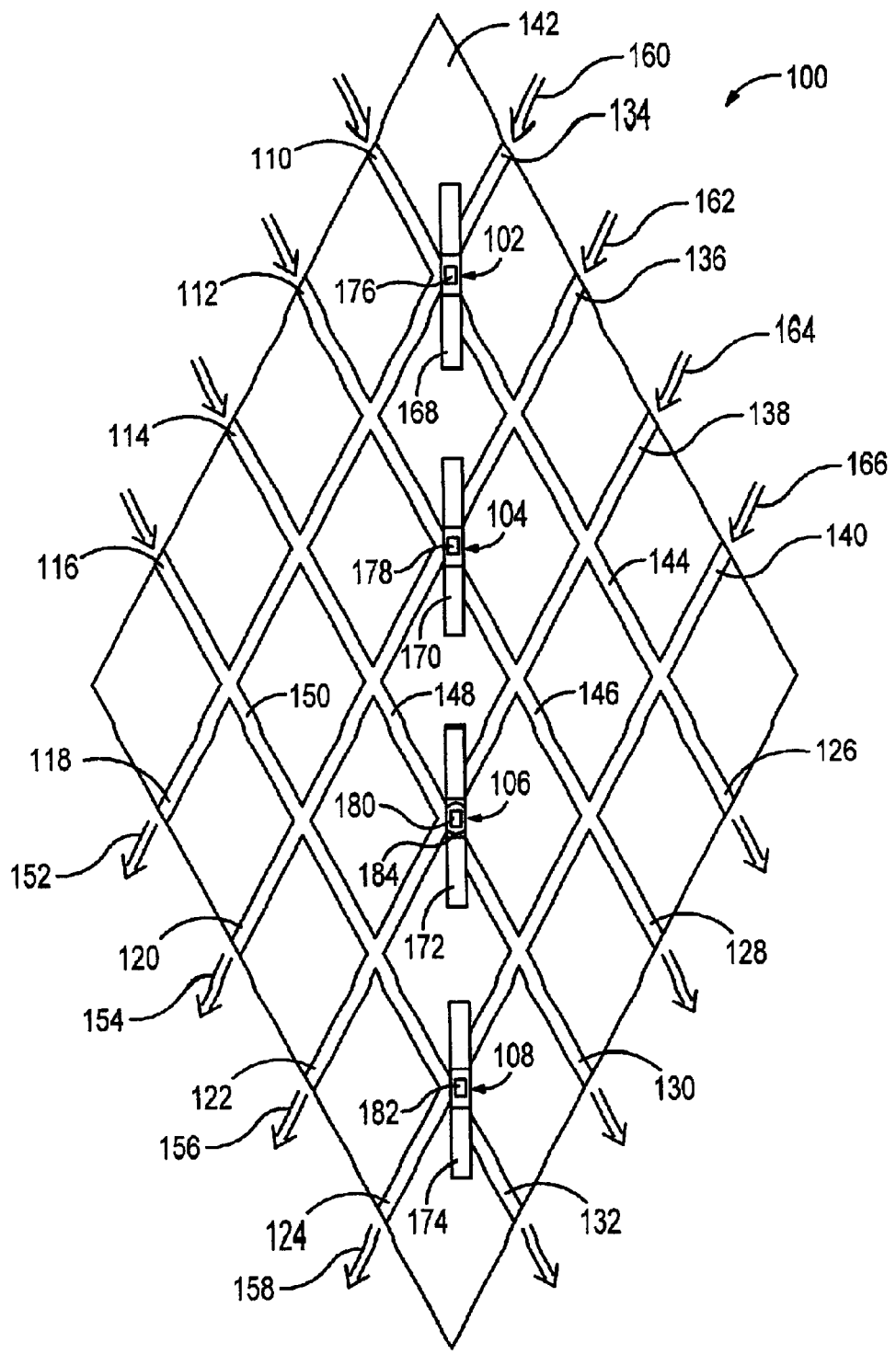
FIG. 3 is a top view of a 4×4 matrix of intersections of first and second optical paths with trenches, being the switching units of FIG. 1, located at the intersections of corresponding first and second optical paths.

With reference to FIG. 3, a matrix 100 of optical paths employs four switching arrangements 102, 104, 106 and 108 for selectively coupling any one of four input ports 110, 112, 114 and 116 to either its operatively associated output port 118, 120, 122 and 124 or its operatively associated drop port 126, 128, 130 and 132. Each input port is "operatively associated" with a single drop port and a single output port, since an optical signal that is introduced via that input port can be transferred only to its associated drop port or its associated output port. Each input port is also operatively associated with a single one of the switching arrangements, since that switching arrangement determines whether the introduced optical signal is directed to the operatively associated drop port or the operatively associated output port.

The matrix 100 may be an add/drop switch, which includes four add ports 134, 136, 138 and 140 that are operatively associated with a single one of the switching arrangements 102–108 and a single one of the output ports 118–124. For each add port, the operatively associated switching arrangement determines whether the optical signals that are introduced via the add port are coupled to the operatively associated output port.

Figure 1:
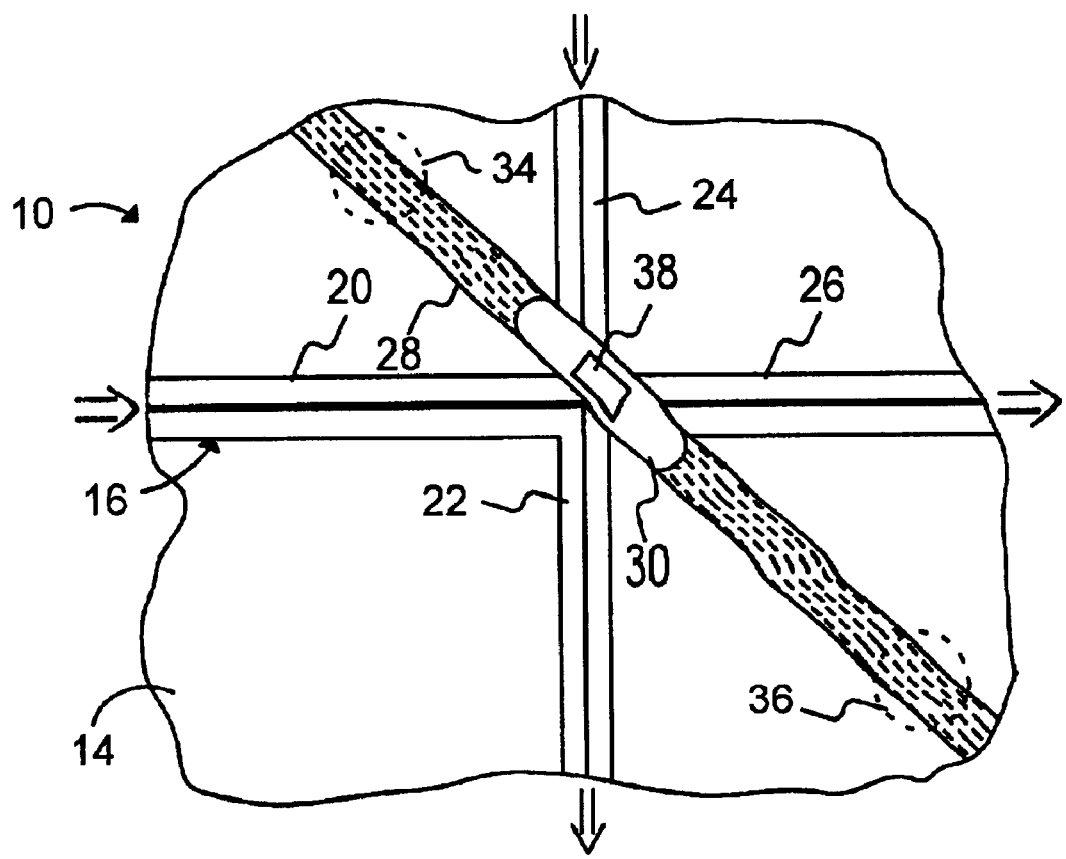
FIG. 1 is a top view of an optical switching unit that utilizes total internal reflection in accordance with the prior art and with the present invention.
Figure 2:
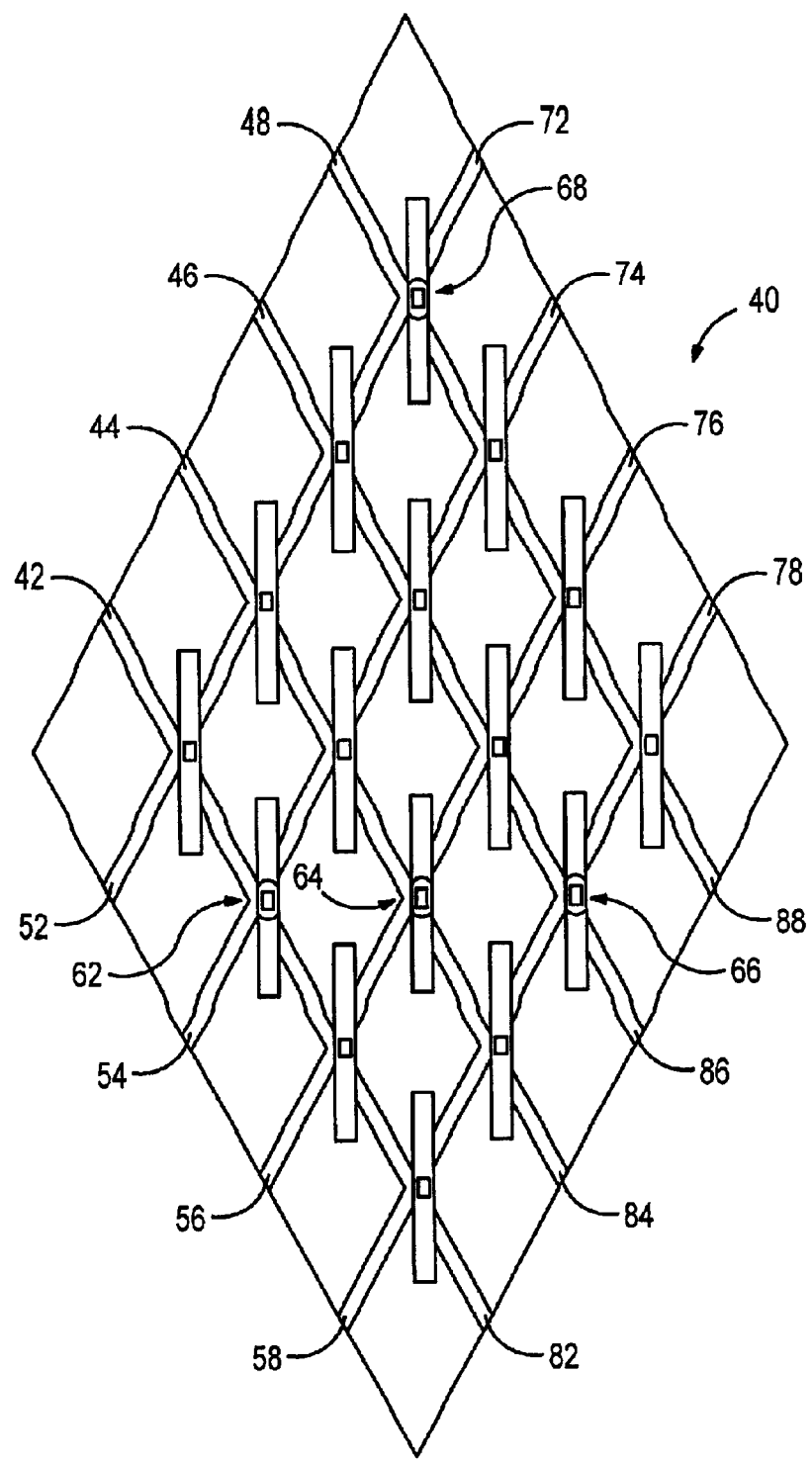
FIG. 2 is a 4×4 matrix of switching units of FIG. 1 which allows optical coupling between any one of the four input ports and any one of the four output ports in accordance with the prior art.

While the matrix 100 includes four ports for every set of input, output, add and drop ports, this is not critical. An alternative number of ports within a set may be utilized without diverging from the invention. Moreover, while the matrix will be described as having "ports" that can be optically connected by selectively coupling optical paths formed by "waveguides," it will be readily recognized by persons skilled in the art that the ports and waveguides are formed by waveguide segments that are fabricated by patterning core material and cladding layers on a substrate, as was described with reference to FIG. 1. The waveguide segments that extend to the edges of the substrate for coupling to optical fibers are identified as "ports," but are identical to the interior waveguide segments.

Each input port 110–116 is aligned with its associated drop port 126–132. The waveguide segments that link the input ports to the drop ports define first optical paths 144, 146, 148 and 150. Each first optical path intersects a single switching arrangement 102–108. The matrix 100 also includes four second optical paths that extend from the respective switching arrangements to the substrate edge regions represented by arrows 152, 154, 156 and 158. These second optical paths may be referred to as output paths. In like manner, there are four third optical paths that extend from the substrate edge regions represented by arrows 160, 162, 164 and 166 to the respective switching arrangements. In the embodiment of FIG. 3, these third optical paths may be referred to as add paths. Also in the embodiment of FIG. 3, the second optical path 158 and the third optical path 160 are generally coextensive with the output port 124 and the add port 134, respectively.

Each switching arrangement 102, 104, 106 and 108 includes a fluid-containing trench 168, 170, 172 and 174. The trenches are shown as being separate from each other, but may be segments of a continuous groove. The fluid is selected such that it has a refractive index that closely matches the refractive index of the core material that forms the waveguide segments. Thus, when the fluid resides at the intersection of waveguides, optical signals will propagate through the trench. On the other hand, if there is an absence of fluid at the intersection, there will be a substantial refractive index mismatch at the interface of a waveguide with the sidewall of a trench. In the orientation shown in FIG. 3, the lefthand sidewall of each trench is at the intersection of an axis of a first optical path 144–150 with the axis of the operatively associated drop path 152–158. The angle of the first optical path to its drop path is selected to provide total internal reflection. The angle of a first optical path to the drop path may be in the range of 90° to 150°, but is more preferably in the range of 96° to 135°.

The presence or absence of fluid at an intersection is determined by operation of a heater 176, 178, 180 and 182. Selectively activating and deactivating the heaters manipulates the fluid of the respective switching arrangement 102, 104, 106 and 108. In effect, the heaters provide a bubble control system. For example, a heater may raise the temperature of the fluid sufficiently high to form a bubble in the index-matching fluid. Once formed, the bubble can be maintained in position by maintaining power to the heater. In FIG. 3, only the third heater 180 is activated, so that a bubble 184 resides at the intersection of the first optical path 148 with the drop path represented by arrow 156. As a result, the switching arrangement 106 is in its reflective state, while the other three switching arrangements 102, 104 and 108 are in their transmissive states. Thus, input ports 110, 112 and 116 are optically coupled to their operatively associated drop ports 126, 128 and 132, respectively. On the other hand, the input port 114 is optically coupled to its operatively associated output port 122. Simultaneously, the add ports 134, 136 and 140 are optically coupled to their operatively associated output ports 152, 154 and 158, respectively, but the add port 164 is isolated from its associated output port 156.

By selectively activating and deactivating the heaters 176, 178, 180 and 182, each add port 110–116 is coupled either to its associated drop port 126–132 or its associated output port 118–124. For each input port that is coupled to its drop port, an associated add port is coupled to its collinear output port.

In the preferred embodiment, the switching of optical signals at the switching arrangements 102–108 is accomplished by manipulation of index-matching fluid. However, other embodiments are contemplated. For example, a micromachine-manipulated mirror may be selectively repositioned to switch the coupling of the add ports 110–116 to the drop ports 126–132 and the output ports 118–124.

Figure 4:
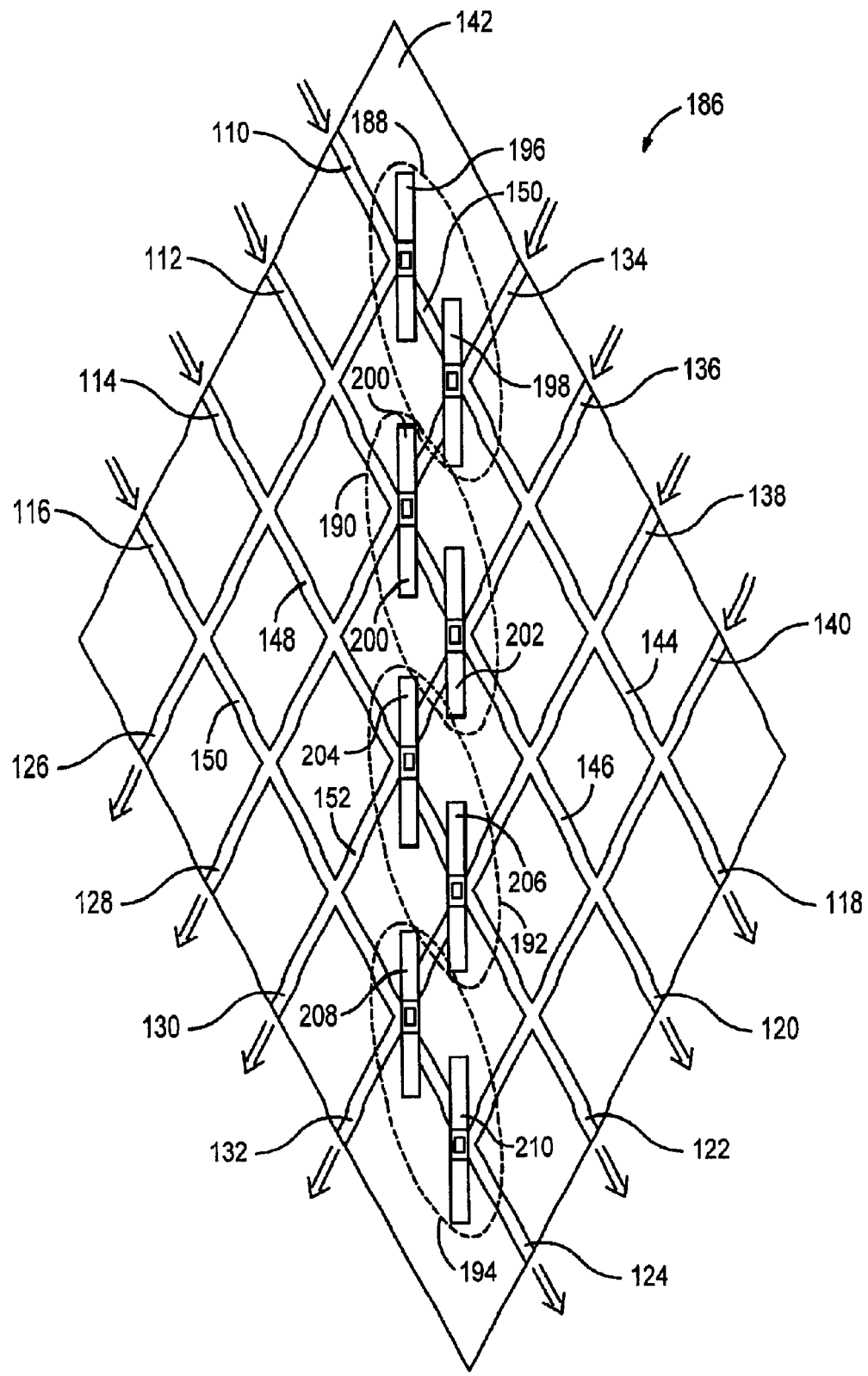
FIG. 4 is a top view of a matrix of intersections of first, second and third optical paths with trenches located at the intersections of corresponding first and second optical paths and at the intersections of corresponding first and third optical paths.

FIG. 4 is an alternative embodiment of an optical add/drop switch 186 in accordance with the invention. Components of FIG. 4 that are functionally identical to components of the embodiment of FIG. 3 are assigned the same reference numerals. Thus, the switch 186 includes four input ports 110–116, four output ports 118–124, four drop ports 126–132 and four add ports 134–140. However, the input ports are aligned with the output ports, rather than with the drop ports. It follows that the add ports are on the opposite side of the substrate 142 from the drop ports.

First optical paths 144, 146, 148 and 150 link the input ports 110–116 to their operatively associated output ports 118–124, respectively. Each first optical path includes a single switching arrangement 188, 190, 192 and 194. Referring specifically to the switching arrangement 188 that is along the first optical path 144 from the input port 110 to the output port 118, the switching arrangement includes a tandem pair of fluid-containing trenches 196 and 198. The two trenches are in "tandem," since they are controlled in unison, so that the trenches are either simultaneously in reflective states or simultaneously in transmissive states. Similarly, each of the other switching arrangements 190, 192 and 194 includes a tandem pair of fluid-containing trenches 200, 202, 204, 206, 208 and 210.

In addition to the first optical signal paths, there are second optical signal paths that extend from the trenches 196, 200, 204 and 208 to the operatively associated drop ports 126–132. Third optical paths extend from the add ports 134–140 to the operatively associated trenches 198, 202, 206 and 210.

Figure 5:
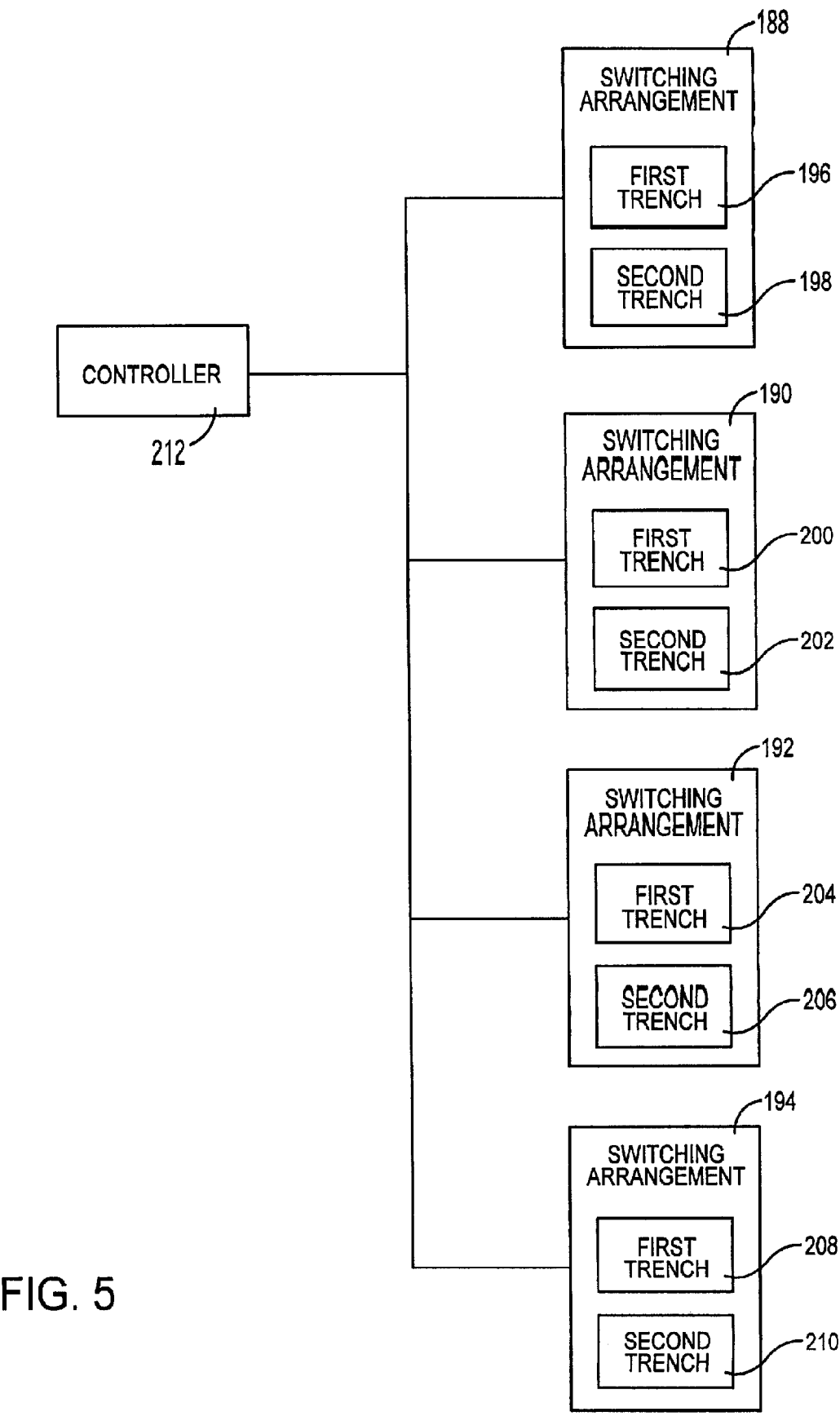
FIG. 5 is a block diagram of circuitry for manipulating fluid in the trenches of FIG. 4.

Referring now to FIG. 5, a controller 212 may be used to change the switching arrangements 188–194 between transmissive states and reflective states. As in FIG. 3, the preferred embodiment is one in which heaters are activated and deactivated to manipulate bubbles within the trenches. The heaters of a particular switching arrangement, such as the first switching arrangement 188, are activated and deactivated in unison.

When the first switching arrangement 188 of FIGS. 4 and 5 is in a transmissive state, the input port 110 is optically coupled to its associated output port 118. That is, signals are free to propagate along the entirety of the first optical path 144. On the other hand, if the switching arrangement 188 is in its reflective state, the signals that are introduced along the input port 110 will be reflected at the trench 196 and will be directed to the second optical path that terminates at the drop port 126. Simultaneously, any signals that are introduced at the add port 134 will be reflected by the trench 198 and will be redirected to the first optical path for exit via the output port 118. A similar scenario will occur for the other three switching arrangements 190, 192 and 194. For example, if the fourth switching arrangement 194 is in a transmissive state, the signals introduced at the fourth input port 116 will exit via the fourth output port 124. Signals that are introduced via the fourth add port 140 will enter the trench 210 and will be lost. By switching the two trenches 208 and 210 into their reflective states, the optical signals introduced via the input port 116 will exit via the drop port 132, while signals introduced via the fourth add port 140 will exit via the output port 124.

One difference between the embodiments of FIGS. 3 and 4 is that the switching arrangements 188, 190, 192 and 194 are comprised of two trenches 196–210, rather than one. However, since the two trenches are operated in tandem, each switching arrangement is a two-state device, in the same manner as the switching arrangements 102, 104, 106 and 108 of FIG. 3.

Another difference in the embodiment of FIG. 4 is that not all of the trenches 196–210 are offset in the same direction relative to the intersection of optical paths. That is, in the orientation illustrated in FIG. 4, the first trenches 196, 200, 204 and 208 are offset to the right of the intersection of axes, while the second trenches 198, 202, 206 and 210 are offset to the left. The opposite offsets ensure that the optical signals are redirected in the intended manner. As a consequence, if a switching arrangement 188–194 is in its reflective state, the reflection that occurs at the first trench will be the mirror image of the reflection that occurs at the second trench. An optical signal that approaches the first trench 196 when it is in a reflective state will be redirected downwardly and to the left. An optical signal that approaches the second trench 198 from the add port 134 will be redirected downwardly and to the right.

Figure 6:
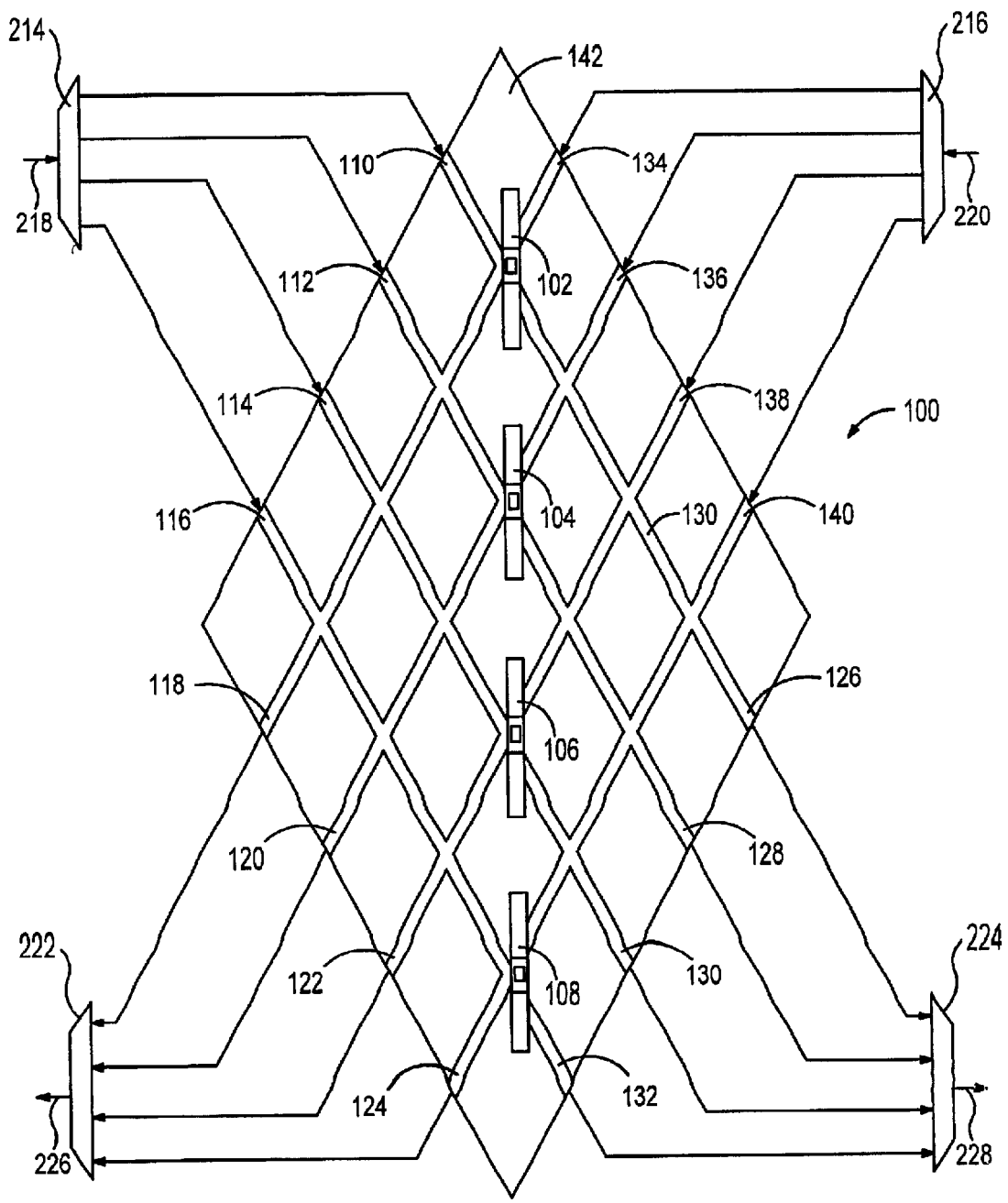
FIG. 6 is a top view of the FIG. 3 with optical multiplexers and demultiplexers associated with the ports of FIG. 3.

Referring now to FIG. 6, the add/drop switch 100 of FIG. 3 is shown as being used in a wavelength-division multiplexed (WDM) arrangement. In such an arrangement, many data signals may be transmitted on a single optical fiber by using a different optical carrier wavelength for each signal. Wavelength demultiplexers 214 and 216 are used for feeding the input ports 110–116 and the add ports 134–140, respectively. Thus, the input 218 to the wavelength demultiplexer 214 may contain four optical signals having different carrier wavelengths, while the four outputs of the demultiplexer 214 will be dedicated to the different signals. Similarly, the optical signal to the input 220 of the demultiplexer 216 will be divided into separate wavelength-based signals for introduction at the add ports 134–140. Two multiplexers 222 and 224 receive the separate signals from the output ports 118–124 and the drop ports 126–132, respectively. The separate signals are combined by the multiplexers for output via a single optical fiber 226 and 228.

The use of WDM has allowed telecommunications networks to greatly increase the transmission capabilities of optical fiber networks without installing new fiber. WDM in current networks is used for point-to-point transmission links, with optical transmitters at one node and optical receivers at the next node. However, in most networks, only some of the traffic that arrives at a particular node has that node as its final destination. The remainder of the traffic is bound for downstream nodes. If local destination traffic can be concentrated or "groomed" into a relatively few number of incoming wavelength signals, the nodes with optical switching such as shown in FIG. 6 allow the express traffic to pass directly through the node, bypassing the local receivers and transmitters. Other applications of the invention are also contemplated.

What is claimed is:

1. An optical switch comprising:
   an array of side-by-side first optical paths;
   an array of side-by-side second optical paths, said first optical paths passing through said second optical paths at intersections;
   first and second ports at opposite sides of at least some of said first optical paths for propagating optical signals to and from said first optical paths;
   third and fourth ports at opposite sides of at least some of said second optical paths for propagating light to and from said second optical paths; and
   a plurality of two-state switching arrangements located at selected said intersections such that each said first optical path includes and is uniquely associated with a single one of said two-state switching arrangements, each said two-state switching arrangement having a tansmissive state in which said first and second ports of said uniquely associated first optical path are coupled, each said two-state switching arrangement having a reflective state in which said first part of said uniquely associated first optical path is coupled to a particular said fourth port of a specific second optical path;
   wherein each said two-state switching arrangement is comprised of a first trench and a second trench each said trench containing fluid responsive to manipulation such that by selective manipulation of said fluid in said trench each said trench is capable of stitching between a reflective state and a transmissive state, each said first trench and said second trench being operatively associated such that said first trench and said second trench are simultaneously in one of a reflective and a transmissive state.

2. The optical switch of claim 1 wherein said two-state switching arrangements are located at specific said intersections to provide an add-drop switch.

3. The optical switch of claim 2, where the number of first optical paths is equal to the number of second optical paths.

4. The optical switch of claim 1, wherein there is a one-to-one correspondence between said two-state switching arrangements and said first optical paths and wherein:
   said first ports are input ports;
   said second ports are output ports;
   said third ports are add ports; and
   said fourth ports are drop ports.

5. The optical switch of claim 4, wherein each said trench along a particular first optical path is located at said in ion of said particular first optical path with a corresponding one of said second optical paths.

6. The optical switch of claim 5, wherein each said second trench alone a particular first optical path is located along said first optical path at said intersection that is adjacent to said intersection at which said first trench of said two-state switching arrangements is located.

7. The optical switch of claim 6, wherein the number of first optical paths is equal to the number of second optical paths.

8. An optical switch comprising:
   plurality of switching arrangements;
   N input optical paths having optically aligned waveguides that are operatively associated with a single switching arrangement, each input optical path hating an input port at a first end and an output port at a second end;
   N drop signal paths having first ends at said switching arrangements and having drop ports at second ends, each said drop signal path being operatively associated with a single input optical path with respect to receiving optical signals therefrom;
   N add signal pats having add ports at first ends and having second ends at said switching arrangements, each said add signal path being operatively associated with a singe input optical path with respect to transferring optical signals thereto; and
   a controller for individually switching each said switching arrangement between one of a transmissive state and a reflective state, said switching arrangements being configured such that switching one of said switching arrangements from said tansmissive state to said reflective state decouples said input and output ports of said operatively associated input optical path and couples said input port to a drop port of said operatively associated drop signal path, wherein each said switching arrangement of an operatively associated input optical path comprises:
      a first trench having a wall at a first intersection of said input optical path with said operatively associated drop signal path;
      second trench having a wall at a second intersection of said input optical path with said operatively associated add signal path;
      a fluid within said first and second trenches, said fluid having a selected refractive index; and
      means for simultaneously manipulating said fluid within said first and second trenches to selectively switch said trenches in unison between transmissive states and reflective states, depending upon the presence or absence of said fluid at said first and second intersections.

9. The optical switch of claim 8 wherein said input optical paths are in a parallel relationship and wherein said intersections of said N drop signal paths and said N add signal paths with said input opt paths form a matrix of (N+1)×N junctions.

10. The optical switch of claim 8 wherein said input ports and add ports are operatively associated with wavelength demultiplexers and said drop ports and said output ports are operatively associated with wavelength multiplexers.

11. An optical switching arrangement for manipulating optical signals among waveguides on a substrate comprising:
   at least th generally parallel first optical paths, each first optical path being formed by a plurality of spaced apart first waveguides;
   at least three generally parallel second optical paths, each of said second optical paths being dedicated to exchanging signals with one of said first optical paths, said second optical paths having first ends intersecting said first optical paths;
   at least three generally parallel third optical paths, each of said third optical paths being dedicated to exchanging signals with one of said first optical paths, said third optical paths having second ends intersecting said first optical paths;
   less than three fluid-containing trenches dedicated to each first optical path, each said fluid-containing trench having a sidewall at an intersection of a specific first optical path with one of said second and third optical paths that is dedicated to said specific first optical path;
   means for manipulating fluid within said trenches such that each said first optical path is limited to being in one of a specific transmissive condition and a specific reflective condition, said fluid enabling propagation of optical signals through said trenches along each first optical path when said fluid resides at said intersections;
   wherein each said first optical path has a dedicated first fluid-containing trench and a dedicated second fluid-containing trench, said sidewall of each said first fluid-containing trench being located relative to said intersection of said first optical path with said dedicated second optical path to reflect optical signals thereto when said first fluid-containing trench has an absence of said fluid at said intersection, each said sidewall of each said second fluid-containing trench being located relative to said intersection of said first optical path with said dedicated third optical signals thereto wherein said second fluid-containing trench has an absence of said fluid at said intersection.

12. The switching arrangement of claim 11 further comprising:
   input ports at first ends of said first optical paths;
   output ports at second ends of said first optical paths;
   drop ports at second ends of said second optical paths; and
   add ports at first ends of said third optical path.

* * * * *